US008037117B2

(12) United States Patent
Saito

(10) Patent No.: US 8,037,117 B2
(45) Date of Patent: Oct. 11, 2011

(54) RANDOM NUMBER DERIVATION METHOD AND RANDOM NUMBER GENERATOR USING SAME

(75) Inventor: Takeshi Saito, Tokyo (JP)

(73) Assignees: Leisure Electronics Technology Co., Ltd., Tokyo (JP); Institute for Advanced Studies Co., Ltd., Tokyo (JP)

( * ) Notice: Subject to any disclaimer, the term of this patent is extended or adjusted under 35 U.S.C. 154(b) by 1131 days.

(21) Appl. No.: 11/604,125

(22) Filed: Nov. 22, 2006

(65) Prior Publication Data

US 2007/0156798 A1 Jul. 5, 2007

Related U.S. Application Data

(63) Continuation of application No. PCT/JP2005/009426, filed on May 24, 2005.

(30) Foreign Application Priority Data

May 24, 2004 (JP) .................................. 2004-153233

(51) Int. Cl.
*G06F 1/02* (2006.01)
*G06F 7/58* (2006.01)
(52) U.S. Cl. ......................... 708/256; 708/250; 708/251
(58) Field of Classification Search .................. 327/164; 708/250–256; 714/728, 739
See application file for complete search history.

(56) References Cited

U.S. PATENT DOCUMENTS 3,124,753 A * 3/1964 Gieseler ......................... 327/164
3,612,845 A    10/1971 Lawlor 6,542,014 B1 * 4/2003 Saito ............................. 327/164
6,763,363 B1    7/2004 Driscoll
7,080,106 B2 * 7/2006 Ikeda et al. .................... 708/250
7,266,575 B2    9/2007 Ikeda
2003/0018674 A1 1/2003 Figotin et al.
2003/0101205 A1 5/2003 Weimerskirch
2005/0198091 A1 * 9/2005 Saito ............................. 708/250

(Continued)

FOREIGN PATENT DOCUMENTS

EP          1 241 565 A1     9/2002

(Continued)

OTHER PUBLICATIONS

PCT International Search Report for PCT Counterpart Application No. PCT/JP2005/009426, 4 pgs., (Sep. 6, 2005).

(Continued)

*Primary Examiner* — Lewis A Bullock, Jr.
*Assistant Examiner* — Matthew Sandifer
(74) *Attorney, Agent, or Firm* — Blakely, Sokoloff, Taylor & Zafman LLP.

(57) ABSTRACT

Disclosed is a method for deriving random numbers at a higher speed than ever before while maintaining desired randomness without spoiling uniformity of the occurrence frequency of each random number. One pulse included in one of two or more mutually-independent random pulse sequences and one pulse included in one of the remaining random pulse sequences are used, respectively, as a start pulse and a stop pulse. Then a time interval between the start pulse and the stop pulse is measured, and the measured value is output. The pulses temporally occur in a random manner, and therefore the obtained sequence of numerical values becomes random numbers. Specifically, in FIG. 1, time intervals $t_1$ to $t_4$ are measured, and these measured values (in FIG. 1, four values) are derived as random numbers.

2 Claims, 4 Drawing Sheets

U.S. PATENT DOCUMENTS

2007/0156798 A1    7/2007  Saito

FOREIGN PATENT DOCUMENTS

| | | |
|---|---|---|
| EP | 1 544 726 A | 6/2005 |
| EP | 1 755 033 A1 | 2/2007 |
| GB | 841 287 | 7/1960 |
| JP | 51-78159 | 7/1976 |
| JP | 51-128239 | 11/1976 |
| JP | 57-45645 A | 3/1982 |
| JP | HEI 11-296348 A | 10/1999 |
| JP | 2000-276329 A | 10/2000 |
| JP | 2000-305753 A | 11/2000 |
| JP | 2001-134422 A | 5/2001 |
| JP | 2002-323971 A | 11/2002 |
| JP | 2003-084970 A | 3/2003 |
| JP | 2004-088320 A | 3/2004 |
| WO | WO 2004/017191 | 2/2004 |
| WO | WO2005/114386 A1 | 12/2005 |

OTHER PUBLICATIONS

PCT Written Opinion of the International Searching Authority for PCT Counterpart Application No. PCT/JP2005/009426, 6 pgs., (Sep. 6, 2005).

PCT International Preliminary Report on Patentability for PCT Counterpart Application No. PCT/JP2005/009426, 8 pgs., (Nov. 29, 2006).

Supplementary European Search Report for EP Counterpart Patent Application No. EP 05 74 3360, 2 pgs., (Aug. 27, 2007).

Office Action for Japanese Counterpart Patent Application No. JP 2006-513758, 2 pgs., (Aug. 3, 2009).

Supplementary European Search Report for EP Patent Application No. EP 03 78 8003, 2 pgs., (Aug. 24, 2007).

PCT International Search Report for PCT Application No. PCT/JP03/01100, 4 pgs., (May 20, 2003).

PCT Written Opinion of the International Preliminary Examining Authority for PCT Application No. PCT/JP03/01100, 7 pgs., (Oct. 28, 2003).

PCT Notification of Transmittal of the International Preliminary Examination Report for PCT Application No. PCT/JP03/01100, 9 pgs., (Feb. 17, 2004).

Reply to PCT Written Opinion for PCT Application No. PCT/JP03/01100, 10 pgs., (Dec. 26, 2003).

Amendment to PCT Application No. PCT/JP03/01100, 12 pgs., (Dec. 26, 2003).

* cited by examiner

RANDOM NUMBER DERIVATION METHOD AND RANDOM NUMBER GENERATOR USING SAME

CROSS-REFERENCE TO RELATED APPLICATIONS

This is a continuation of prior International Patent Application No. PCT/JP2005/009426, filed on May 24, 2005, which claims priority from Japanese Patent Application No. 2004-153233, filed on May 24, 2004, each of which is incorporated herein by reference in its entirety.

BACKGROUND OF THE INVENTION

1). Field of the Invention

The present invention relates to a random number derivation method for deriving physical random numbers from a random number source element, and a random number generator utilizing the method.

2). Discussion of Related Art

As one technique for deriving physical random numbers based on a natural phenomenon, there has been known a technique using a resistor, a semiconductor such as a diode, or a conductor, as a thermal noise source element. Thermal noises occurring in the thermal noise source element are random in both occurrence frequency and amplitude, and therefore physical random numbers can be derived based on the thermal noises. Various random number generators utilizing such a thermal noise source element are disclosed in a great number of publications. The random number generators are required to improve uniformity of the occurrence frequency of each value to be obtained (quality level as random numbers) and produce random number at a higher speed.

The most typical technique for generating physical random numbers using a thermal noise source element is designed to amplify and sample a thermal noise output from a thermal-noise source element at a certain moment, and compare the sampled value with a given threshold to derive a random number. Specifically, thermal noises output from a thermal noise source element and amplified are sampled in certain cycles. Then, according to a predetermined rule that "1" will be assigned to the sampled value if it is greater than a given threshold, and "0" will be assigned to the sampled value if it is not greater than the threshold, physical random numbers can be derived in a digital manner.

As another technique for generating physical random numbers using a thermal noise source element, there has been known a technique designed to measure a time interval between a time point when a randomly-occurring thermal noise exceeds a given threshold and a subsequent time point when another randomly-occurring thermal noise exceeds the threshold, and derive a random number value directly from the measured temporal value. One example of a random number generator based on this technique is described in Japanese Patent Laid-Open Publication No. 2001-134422.

This random number generator is provided with a first circuit for amplifying a thermal noise output from a thermal noise source element and generating a rectangular pulse which rises at the moment when a waveform of the pulse exceeds a given threshold, a second circuit for generating clocks having a frequency far greater than that of the pulse, and a counter for counting the clocks, and designed to count the clocks generated during the period from the occurrence of one pulse until the occurrence of a subsequent pulse, and derive a random number from the counted value. In this technique, due to a limited number of bits in a counter (given that the number of bits is "n"), the counter is reset to restart counting from 1, every time it counts $2^n$ times, and consequently an actually derivable number of random number values is restricted to $2^n$. Even so, in the above technique, n bits of random numbers are generated per one pulse from a thermal noise, and therefore random numbers can be generated at a higher speed as compared with the technique designed to momentarily sample a thermal noise.

Patent Publication 1: Japanese Patent Laid-Open Publication No. 2001-134422.

SUMMARY OF THE INVENTION

Problems to be Solved by the Invention

In the above technique designed to measure a time interval between pulses, if the number of pulses to be derived per unit time is increased to produce random numbers at a higher speed, the pulses are more likely to occur in temporally adjacent relation to each other. In this case, due to frequency characteristics of the amplifying circuit and other factor, the temporally adjacent pulses are liable to become indistinguishable from each other. Thus, the occurrence frequency of a relatively small value before completion of one cycle of a counting operation in the counter is slightly lowered to affect uniformity of the occurrence frequency of a random number.

In view of the above technical background, it is an object of the present invention to derive random numbers at a higher speed than ever before without spoiling the uniformity of the occurrence frequency of each random number.

Means for Solving the Problem

The present invention provides a random number derivation method which comprises generating at least two or more mutually-independent random pulse sequences, measuring a time interval between two pulses each belonging, respectively, to a different one of the random pulse sequences, and outputting the measured value as a random number. In this method, the measurement of the time interval may include allowing one of the two pulses which is temporally precedingly generated and the other pulse which is subsequently generated, to be used, respectively, as a start pulse and a stop pulse for a counter, and allowing the counter to count the number of count pulses having a frequency greater than that of the random pulse sequences.

The present invention also provides a random number generator using the above method. For example, the random number generator may comprise at least two random pulse generating means each adapted to generate an independent random pulse sequence, and time measuring means for measuring a time interval between respective pulses from one of the random pulse generating means and from one of the remaining random pulse generating means. The measured value in the time measuring means is outputted as a random number.

More specifically, the random number generator may comprise a number N of 1st to N-th random pulse generating means each adapted to generate an independent random pulse sequence (wherein N is an integer number of two or more), and time measuring means adapted to measure a number (N−1) of time intervals between respective pulses from the 1st random pulse generating means and from the remaining random pulse generating means, and a number (N−1) of time intervals between respective pulses from the 2nd random pulse generating means and from the remaining random pulse generating means, and perform remaining measurements in the same manner until a number (N−1) of time intervals between respective pulses from the N-th random pulse generating means and from the remaining random pulse generating means are measured. Each of the measured values in the time measuring means is outputted as a random number.

In the above random number generator, the time measuring means may include count-pulse generating means for generating count pulses having a frequency greater than that of the random pulse sequences, and a counter. The time measuring means may be adapted to receive, from the counter, a temporally preceding pulse and a temporally subsequent pulse as, respectively, a start pulse and a stop pulse, respectively, for the time interval to be measured, and count the number of the count pulses generated between the start pulse and the stop pulse.

Effect of the Invention

In the present invention, a time interval between respective pulses from one of the plurality of random pulse generating means, i.e., in one of the mutually-independent random pulse sequences, and from one of the remaining random pulse generating means, is measured. Thus, even if the pulses occur in temporally adjacent relation to each other, they can be clearly distinguished from each other. This makes it possible to prevent the occurrence frequency of a relatively small value from being lowered so as to maintain uniformity of the occurrence frequency of a random number.

Further, in the present invention, the N mutually-independent random pulse sequences are provided to allow mutually-independent random numbers to be obtained in a number of N (N−1), i.e., a number approximately proportional to a square value of N. Thus, even if a frequency in each of the random pulse sequences is not so high, a high-speed random number generator can be established by increasing the number of random pulse sequences.

DETAILED DESCRIPTION OF THE INVENTION

Figure 1:
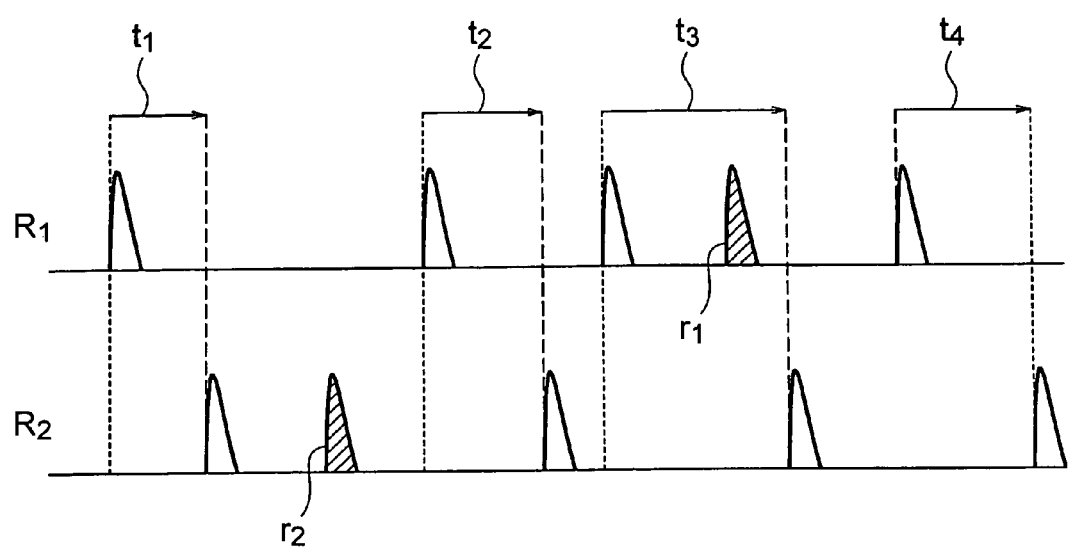
FIG. 1 is an explanatory diagram showing a fundamental concept of the present invention.

With reference to the drawings, an embodiment of the present invention will now be described. FIG. 1 is an explanatory diagram showing a fundamental concept of the present invention. $R_1$ and $R_2$ in FIG. 1 represent two mutually-independent pulse sequences of random pulses. As used in this specification, the term "random pulses" means a train of pulses temporally occurring in a random manner, and the term "mutually independent" means that a plurality of pulse sequences are obtained, respectively, from separate random pulse generating devices.

The present invention is based on a fundamental conception of: using one pulse included in a first pulse sequence of random pulses and one pulse included in a second pulse sequence of random pulses independent of the first pulse sequence, respectively, as a start pulse and a stop pulse; measuring a time interval between the start pulse and the stop pulse; and outputting the measured value. The pulses temporally occur in a random manner, and therefore the obtained sequence of numerical values becomes random numbers. Specifically, in FIG. 1, each of time intervals $t_1$ to $t_2$ is measured, and the measured values (in this example, four values) are derived as random numbers.

Instead of the above technique in FIG. 1 in which the pulses are included in independent pulse sequences, a technique of using a certain pulse and a subsequently-occurred pulse each included in a common pulse sequence, respectively, as a start pulse and a stop pulse, and measuring a temporal time interval of the two pulses (this technique will hereinafter be referred to as "the old-style technique") also allows random numbers to be obtained at a certain acceptable level. In the old-style technique, each of the pulses has a finite temporal width. Thus, if two pulses occur in temporally adjacent relation to each other, they are indistinguishable from each other due to the aforementioned circuit-related restrictions to cause lowering in the occurrence frequency of a relatively small value, which leads to deterioration in the overall uniformity of occurrence frequency. As to this point, in the present invention, one of the two pulses included, respectively, in mutually-independent pulse sequences is used as a start pulse, and the other pulse is used as a stop pulse. Thus, even if the two pulses occur in temporally adjacent relation to each other, they can be distinguished from each other to eliminate the problem about deterioration in uniformity of occurrence frequency.

When random numbers are generated based on the technique illustrated in FIG. 1, a pulse $r_1$ in the pulse sequence $R_1$ and a pulse $r_2$ in the pulse sequence $R_2$ cannot be used for the random number generation. In this specification, such a pulse will be referred to as a "dead pulse".

The following description will describe at what rate the "dead pulse" unusable for the random number generation occurs in a pulse sequence. On the premise of two mutually-independent pulse sequences being provided, the pulse sequences are adjusted such that pulses in each of the pulse sequences occur in a Poisson arrival pattern, and respective average time intervals between successively-occurring pulses in the pulse sequences are equal to each other. Given that the average time interval is to, an interval width to be determined by two adjacent pulses on each of the pulse sequences conforms to an exponential distribution, and a probability distribution function thereof is expressed by the following formula:

$$f(t:t_0) = \frac{1}{t_0} e^{-t/t_0} \quad (1)$$

The number of pulses occurring on the other pulse sequence during a time interval t conforms to a Poisson distribution. The probability that a number n of pluses occur within the time interval t is expressed by the following formula:

$$P\left(n:\frac{t}{t_0}\right) = \frac{(t/t_0)^n}{n!} e^{-t/t_0} \quad (2)$$

Thus, given that the probability that a number n of pulses on one of the pulse sequences occur between one pulse pair on the other pulse sequence is D (n), the following formula is satisfied:

$$D(n) = \int_0^\infty f(t:t_0)P\left(n:\frac{t}{t_0}\right)dt = \frac{1}{2^{n+1}n!}\int_0^\infty \left(\frac{2t}{t_0}\right)^n e^{-\frac{2t}{t_0}} d\left(\frac{2t}{t_0}\right) = \frac{1}{2^{n+1}} \quad (3)$$

In this technique, when a pulse on one of the pulse sequences does not occur between any of the pulse pairs on the other pulse sequence, it does not contribute to the random number generation. In this case, n=0, and thus D (0)=0.5. In other words, the "dead pulse" occurs at a frequency of ½, and the number of pulses contributing to the random number generation is one-half of that of all the pulses.

Figure 2:
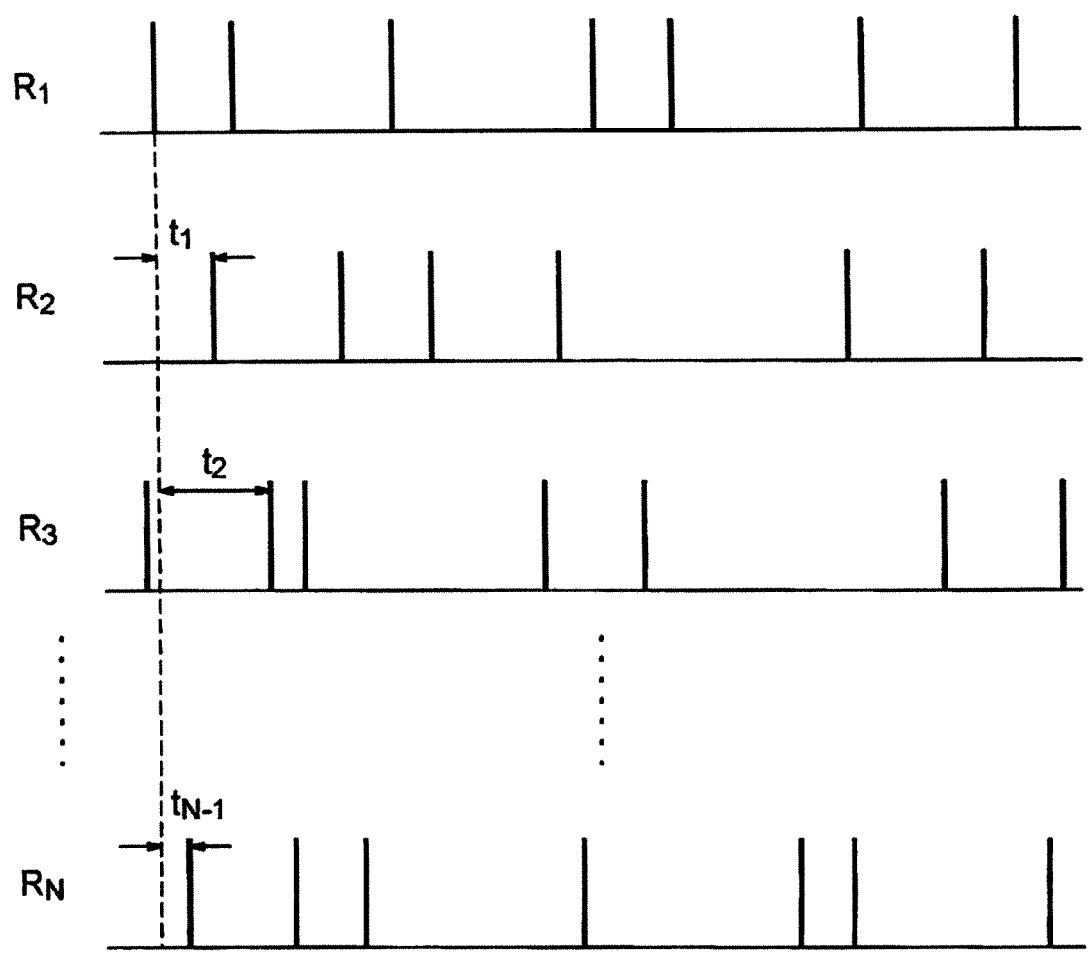
FIG. 2 is an explanatory diagram showing a generalized technique of the concept in FIG. 1, with a number N of pulse sequences $R_1$ to $R_N$ being obtained from a number N of individual random pulse generating devices.

FIG. 2 shows a generalized technique of the concept in FIG. 1, with a number N of pulse sequences $R_1$ to $R_N$ obtained from a number N of individual random pulse generating devices. If the above "dead pulses" are ignored, and one pulse included in the pulse sequence $R_1$ is used as a start pulse, a number (N−1) of random numbers can be simultaneously derived by using a number (N−1) of pulses included in the remaining pulse sequences $R_2$ to $R_N$ as stop pulses, and measuring a number (N−1) of time intervals $t_1$ to $t_{N-1}$. Similarly, if one pulse included in the pulse sequence $R_2$ is used as a start pulse, a number (N−1) of random numbers can be simultaneously derived by using a number (N−1) of pulses included in the pulse sequences $R_1$, $R_3$ to $R_N$ as stop pulses. In this manner, a number (N−1) of random numbers can be derived from each of the pulse sequences, and therefore the number of simultaneously-derivable random numbers will be N (N−1). Now, considering the "dead pulses", the number of actually-derivable random numbers is N (N−1)/2, and increases approximately in proportion to a square value of the number N of random pulse generating devices.

When in this technique based on the present invention the random pulse generating device and a peripheral circuit are adjusted such that a number M of pulses occur per second on average in each of the pulse sequences $R_1$ to $R_N$, the number of random numbers obtainable per second will be MN (N−1)/2. By comparison, in the old-type technique provided with a number N of pulse sequences in the same way, the number of simultaneously-derivable random numbers is MN.

When N=2, the number of simultaneously-derivable random numbers in the old-type technique is 2M, which is greater than M in the technique based on the present invention. When N=3, both of the techniques provides a number 3M of random numbers. However, when N=4 or more, the present technique provides a larger number of random numbers than that in the old-type technique. Then, as the value of N becomes larger, the number of derivable random numbers in the present technique will sharply increase as compared with the old-type technique. For example, given that N=10, while the number of derivable random numbers in the old-type technique is 10M, the number of derivable random numbers in the present technique is 45M. Given that N=100, while the number in the old-type technique is 100M, the number in the present technique drastically increases to 4950M.

Heretofore, a strategy for generating random numbers at a higher speed has been determined by primarily focusing on increasing the number of random numbers derivable from a random number source element per unit time, and certain positive results have been achieved. This approach of increasing a speed in the random number source element itself will reach a limit at some future time due to technical and cost barriers. In contrast, according to the present technique, the number of random number source elements is increased even if each of the random number source elements has a not-so-high speed, to allow a speed of deriving random numbers to be drastically increased as a whole.

First Embodiment

Figure 3:
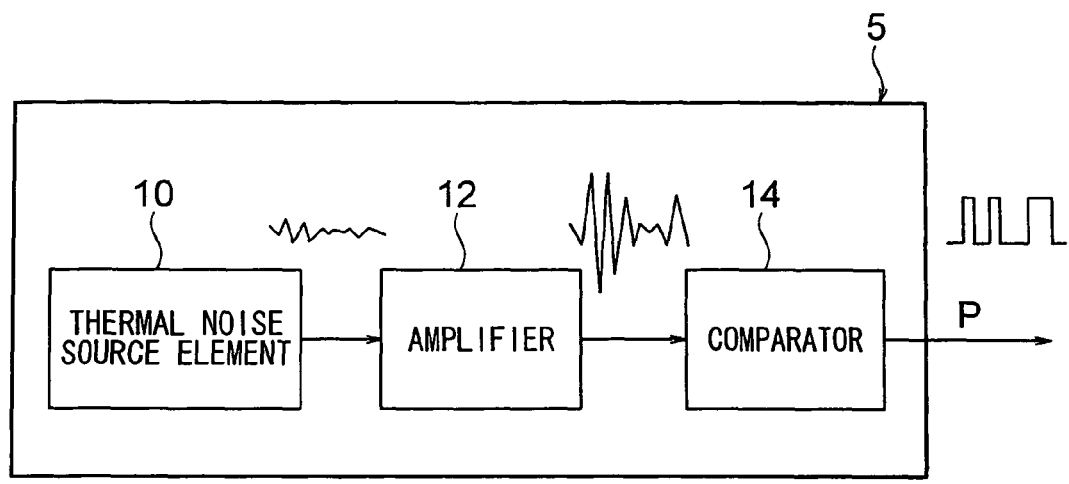
FIG. 3 is a block diagram showing a random pulse generating circuit 5.

A first embodiment of the present invention will be described below. FIG. 3 is a block diagram showing a random pulse generating circuit 5, and FIG. 4 is a block diagram showing a random number generator using the random pulse generating device 5 (5A to 5D) in FIG. 3.

In the circuit illustrated in FIG. 3, a thermal noise source element 10 is operable to output a pulse-shaped potential variation based on a thermal noise, and a resistor is often used as a typical thermal noise source element. It is generally recognized that the occurrence of thermal noises is a random phenomenon.

A block indicated by the reference code 12 is an amplifier for amplifying a thermal noise occurring in the thermal noise source element 10, and a block indicated by the reference code 14 is an comparator for comparing an amplified thermal noise signal with a predetermined threshold and outputting the comparison result in the form of a pulse P. Thus, the output pulse P from the comparator serves as a random pulse based on the randomly-occurring thermal noise.

Figure 4:
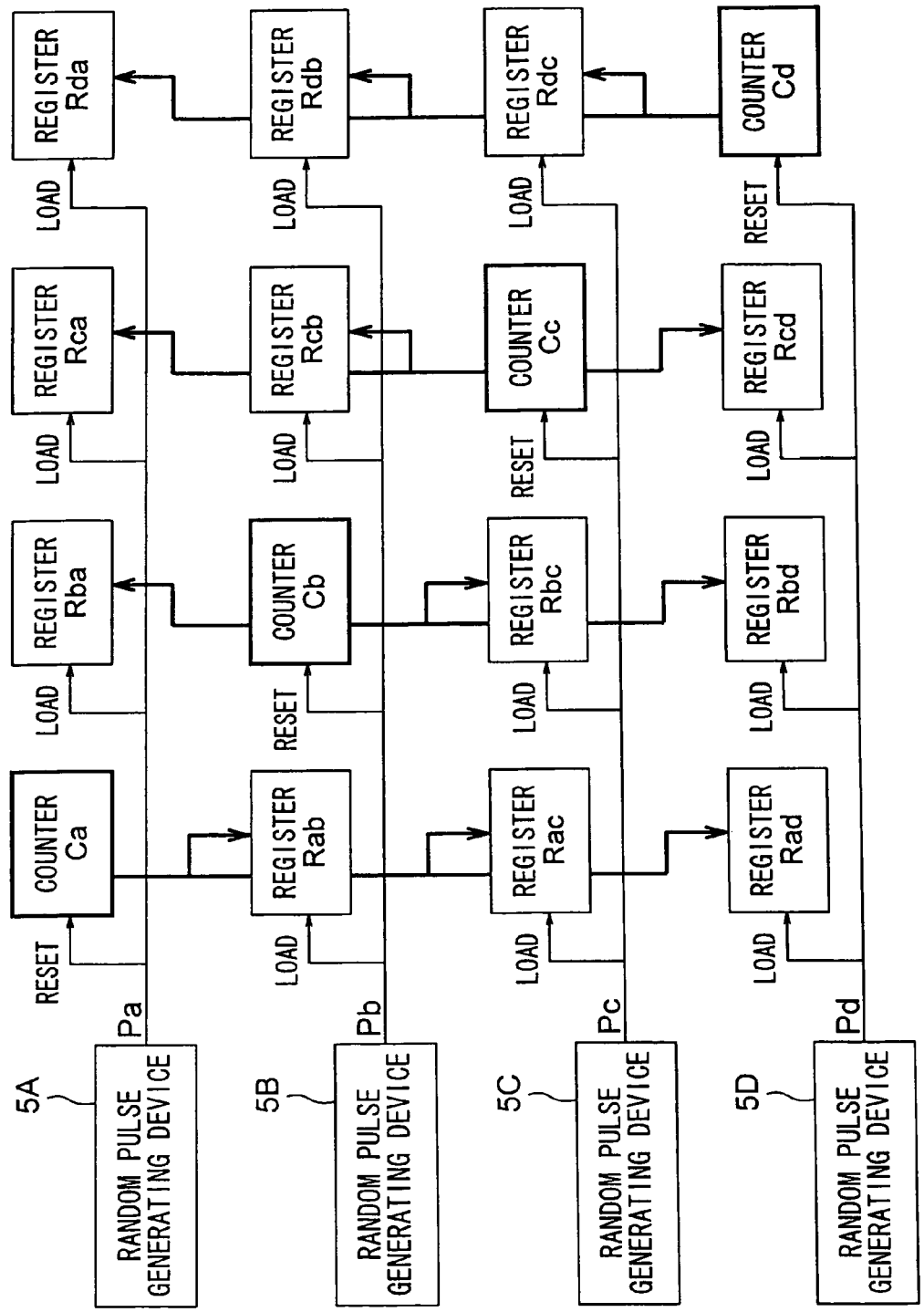
FIG. 4 is a block diagram showing a random number generator using the random pulse generating device in FIG. 3.

A random number generator in FIG. 4 is configured using four of the random pulse generating devices (5A to 5D) illustrated in FIG. 3. While the number of the random pulse generating devices is four in this embodiment, it may be any number of two or more.

An output signal Pa from the random pulse generating device 5A is a pulse sequence of random pulses, and is supplied to a counter Ca as a reset signal (start signal) and to each of three registers Rba, Rca, Rda as a load signal (stop signal). In the same manner, each of the random pulse generating devices 5B, 5C, 5D is operable to supply a corresponding one of their random pulse sequences Pb, Pc, Pd to a corresponding one of three sets of one counter and three registers. The random pulse sequences Pb, Pc, Pd output, respectively, from the random pulse generating devices 5A, 5B, 5C, 5D are independent from each other as well as the random pulse generating devices 5A, 5B, 5C, 5D.

The counter Ca is operable to generate a count pulse (which is required to have a frequency greater than that of at least the random pulses) at a high speed and supply the count pulse to each of the registers Rab, Rac, Rad connected, respectively, to the random pulse generating devices 5B, 5C, 5D. The register Rba is operable to receive a count pulse from a counter Cb connected to the random pulse generating device 5B. The register Rca is operable to receive a count pulse from a counter Cc connected to the random pulse generating device 5C. The register Rda is operable to receive a count pulse from a counter Cd connected to the random pulse generating device 5D.

Each of the counters Ca, Cb, Cc, Cd is operable, in response to receiving the reset signal from a corresponding one of the random pulse generating devices, to start supplying the count pulse. Each of the registers is operable, in response to receiving the load signal from a corresponding one of the random pulse generating devices, to store a count value of the count pulses supplied thereto. This count value stored in each of the counter serves as a random number value.

The random number generator in FIG. 4 is provided with the four random pulse generating devices (N=4). Given that each of the random pulse generating devices outputs a number M of random pulses per second, a random number generation speed of this random number generator is calculated as 6M per second by assigning these values to the aforementioned MN (N−1)/2. Thus, the speed of the random number generator in the present technique becomes higher as compared with 4M in the old-type technique.

What is claimed:

1. A random number generator comprising:
   a plural number of random pulse generating devices generating random pulses independently of each other, each of said random pulse generating devices generating random pulses based on a pulse-shaped potential variation based on a thermal noise in a thermal noise source element;
   a plural number of counters, each of which is coupled to a corresponding one of said plural number of random pulse generating devices, each of said plural number of counters counting count pulses whose frequency is constant and higher than that of said received random pulses,
   wherein each of said plural number of counters receives a random pulse as a reset signal from the corresponding random pulse generating device with which the counter is coupled and outputs the counted value of said count pulses; and
   plural sets of registers, each set of registers comprising one or more registers coupled to a corresponding one of said plural number of random pulse generation devices,
   wherein each of said registers receives a random pulse as a load signal from the corresponding random pulse generating device with which the register is coupled, receives the counted value of said count pulses from a counter coupled to a random pulse generating device which is different from that with which the register is coupled, stores the counted value of the count pulses, and further outputs the stored counted value of the count pulses at the time of receiving the load signal, and
   wherein said count values stored in said registers are outputted as random numbers from said random number generator.

2. The random number generator of claim 1, wherein the number of registers in each set of registers is identical with the number which is less than the number of said random pulse generating devices by 1.

* * * * *